(12) United States Patent
Suess et al.

(10) Patent No.: US 11,940,035 B2
(45) Date of Patent: *Mar. 26, 2024

(54) PLANETARY WHEEL FOR A PLANETARY GEAR AND PLANETARY CARRIER FOR SUCH A PLANETARY WHEEL

(71) Applicant: IMS GEAR SE & Co. KGaA, Donaueschingen (DE)

(72) Inventors: Marius Suess, Blumberg (DE); Simon Schwoerer, Brigachtal (DE); Steffen Aberle, Koenigsfeld (DE); Jens Fechler, Huefingen (DE)

(73) Assignee: IMS GEAR SE & CO. KGAA, Donaueschingen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/083,070

(22) Filed: Dec. 16, 2022

(65) Prior Publication Data
US 2023/0193979 A1    Jun. 22, 2023

(30) Foreign Application Priority Data
Dec. 16, 2021   (EP) ..................... 21215316

(51) Int. Cl.
*F16H 55/17* (2006.01)
*F16H 1/32* (2006.01)
*F16H 57/08* (2006.01)

(52) U.S. Cl.
CPC ............... *F16H 1/32* (2013.01); *F16H 55/17* (2013.01); *F16H 57/082* (2013.01)

(58) Field of Classification Search
CPC ... F16H 55/17; F16H 57/082; F16H 2057/085
See application file for complete search history.

(56) References Cited

U.S. PATENT DOCUMENTS 5,558,593 A * 9/1996 Roder ............... F16H 1/28
                                                     475/346
5,564,995 A * 10/1996 Roder ............... F16H 1/28
                                                     475/346

(Continued)

FOREIGN PATENT DOCUMENTS

CN   110486446 A * 11/2019  ......... B29C 45/0053
CN   112728014 A    4/2021

(Continued)

OTHER PUBLICATIONS

Search Report dated May 11, 2022, in parallel European patent No. 12 215 316.7.

*Primary Examiner* — Sherry L Estremsky
(74) *Attorney, Agent, or Firm* — Nath, Goldberg & Meyer; Jerald L. Meyer (57) ABSTRACT

The present invention relates to a planetary wheel (10) for a planetary gear (14) with a planetary wheel bore (28) which runs coaxially or parallel to the planetary wheel axis of rotation (APR) and which at least partially runs through the planetary wheel axis (22). The invention also relates to a planetary carrier (44) for such a planetary wheel (10), comprising a carrier body (46) with a first disk-shaped body (48) which has at least one first bearing recess (60), which has at least one circumferentially extending first catching projection (64), and with a second disk-shaped body (50) having at least one second bearing recess (62), which has at least one circumferentially extending second catching projection (66).

20 Claims, 9 Drawing Sheets

(56) References Cited

U.S. PATENT DOCUMENTS

| | | | |
|---|---|---|---|
| 8,597,156 B2 | 12/2013 | Araki et al. | |
| 9,359,957 B2* | 6/2016 | Makulec | F16H 55/17 |
| 9,759,305 B2* | 9/2017 | Lemmers, Jr. | F16H 55/17 |
| 11,353,105 B2* | 6/2022 | Fuchs | F16H 57/082 |
| 2016/0229009 A1* | 8/2016 | Klein-Hitpass | B23P 15/14 |
| 2019/0162293 A1 | 5/2019 | Nique et al. | |
| 2023/0204097 A1* | 6/2023 | Süss | F16H 57/082 |
| | | | 475/331 |

FOREIGN PATENT DOCUMENTS

| | | |
|---|---|---|
| DE | 102015219455 A1 | 4/2017 |
| DE | 102019104898 A1 | 8/2020 |
| EP | 3306140 A1 | 4/2018 |

* cited by examiner

Fig.17

PLANETARY WHEEL FOR A PLANETARY GEAR AND PLANETARY CARRIER FOR SUCH A PLANETARY WHEEL

The present invention relates to a planetary wheel for a planetary gear and a planetary carrier for such a planetary wheel.

Planetary gears are used in particular when high step-up or step-down gear ratios have to be provided in a small space. For example, modern vehicles have a large number of auxiliary drives, such as parking brake actuators, tailgate drives, sunroof drives or longitudinal seat adjustments. Electric motors are used almost exclusively as a source of torque, but they are operated at comparatively high speeds and low torques. In these cases, planetary gears provide the necessary step-up or step-down gear ratios in a small space. Among other things, due to the possibility of being able to produce large quantities at low cost and due to the low noise level, planetary gears and in particular the planetary wheels are made of plastic. In this case, production using the injection molding process is an option, with the boundary conditions that must be taken into account in the injection molding process leading to designs, in particular of the planetary carrier, which deviate more or less widely from the classic designs. Planetary carriers and planetary wheels made of plastic are known, for example, from EP 3 722 641 A1, DE 10 2005 023 542 A1, DE 10 2015 119 803 A1, EP 3 527 846 A1, EP 3 486 523 A1 and WO 2014/095966 A1.

Due to the fact that such planetary gears are suitable for mass production, the quick and safe assembly of such planetary gears is an important additional aspect. In addition, the planetary gears are sometimes operated under heavy load in the applications mentioned above, so that the fatigue strength of the planetary gears in particular is another important aspect that sometimes conflicts with injection molding production.

The object of one embodiment of the present invention is to propose a planetary wheel with which the requirements described above can be met and with which it is possible to create a planetary wheel and a planetary carrier for a planetary gear with simple and inexpensive means, which are configured in such a way that the planetary gear can be easily manufactured and assembled and has a high fatigue strength or a high maximum transmittable misuse torque.

This object is achieved with the features specified in claims 1 and 12. Advantageous embodiments are the subject matter of the dependent claims.

One embodiment of the invention relates to a planetary wheel for a planetary gear, comprising
  a wheel body with a first planetary wheel end face and a second planetary wheel end face,
  a planetary wheel axle, which
    defines a planetary wheel axis of rotation of the planetary wheel, and comprises
    a first bearing section and
    a second bearing section, wherein
  the first bearing section projects beyond the first planetary wheel end face and the second bearing section projects beyond the second planetary wheel end face,
  wherein at least one planetary wheel bore running coaxially or parallel to the planetary wheel axis of rotation at least partially runs through the planetary wheel axle.

The proposed planetary wheel has a first bearing section and a second bearing section, which are arranged outside of the actual wheel body and with which the planetary wheel can be introduced into a first bearing recess or into a second bearing recess of a planetary carrier. Due to the fact that the planetary wheel has a planetary wheel bore which runs coaxially to the planetary wheel axis of rotation, it is possible to introduce a pin of an assembly tool into this planetary wheel bore and use this assembly tool to insert the planetary wheel into the first bearing recess or into the second bearing recess of the planetary carrier. As mentioned at the outset, the proposed planetary wheels and the proposed planetary carriers are suitable for being made of plastic. However, this results in the situation that the functionally relevant surfaces, in particular the surfaces of the first bearing section and the second bearing section and the teeth of the tooting, are comparatively sensitive to external influences, so that damage to the functionally relevant surfaces cannot always be reliably ruled out, especially during assembly. The surfaces of the planetary wheel bore, on the other hand, are not functionally relevant surfaces. In the event that they are damaged, for example when the pin of the assembly tool is introduced into the planetary wheel bore, this will not negatively affect the functionality of the planetary wheel and consequently the planetary gear. In this respect, the planetary gear with the proposed planetary wheels can be manufactured with a more stable manufacturing process compared to known manufacturing processes and consequently with a small amount of rejects.

According to a further embodiment, the planetary wheel may have exactly one planetary wheel bore, which runs through the entire planetary wheel. In order to introduce the above-mentioned pin of an assembly tool into the planetary wheel bore, it is not absolutely necessary for the planetary wheel bore to run through the entire planetary wheel. However, the manufacture of a planetary wheel bore, which runs through the entire planetary wheel, is usually simpler than a planetary wheel bore, which only partially projects into the planetary wheel, in particular due to the boundary conditions of the injection molding process. In addition, the elasticity of the entire planetary wheel and in particular of the first bearing section and the second bearing section is increased, which is particularly advantageous from the point of view of assembly technology when the first bearing recesses and second bearing recesses of the planetary carrier already mentioned have first and second catching projections, which in turn exhibit a certain elasticity. This point will be discussed in more detail below.

In a further developed embodiment
  the first bearing section may have a first extension starting out from the first planetary wheel end face and
  the second bearing section may have a second extension starting out from the second planetary wheel end face, wherein
  the first extension is different from the second extension.

As mentioned, the first bearing section and the second bearing section are introduced into corresponding first bearing recesses or second bearing recesses of the planetary carrier. Again, in particular due to requirements that result from the injection molding process, it may be necessary to configure the first bearing recess and the second bearing recess with different lengths relative to the axis of rotation of the planetary carrier, especially if a separate insert is to be connected to the planetary carrier. With the different first extensions and second extensions of the first bearing section or second bearing section, the different extensions can be taken into account, so that a largely maximized contact area can be provided, which leads to a correspondingly lower surface pressure. It can be useful to provide the first bearing recess and the second bearing recess with different fits for interaction with the first bearing section and with the second bearing section, respectively, in order to take into account the different contact surfaces.

Since in this case attention must be paid to the correct alignment of the planetary wheels during assembly, it may be advisable to additionally mark one of the bearing sections in a recognizable manner, for example with a notch.

At this point it should be noted that, depending on the configuration of the planetary carrier and depending on the loads to be expected in operation, it is also possible to choose the first extension to be the same as the second extension. From a manufacturing point of view, this has the advantage that the planetary wheels do not have to be inserted into the planetary carrier in a specific orientation.

In a further developed embodiment, the planetary wheel axle may be formed by the wheel body. In principle, it is possible to provide, for example, a planetary wheel axle made of steel, onto which the planetary wheel is slipped. This is the case, for example, in WO 2014/095966 A1. In this embodiment, however, the planetary wheel axle is an integral part of the wheel body, so that the wheel body is configured in one piece. This eliminates an additional assembly step. In addition, the number of components is reduced, which simplifies storage and keeps costs low.

In another embodiment, the gear body may comprise a sprocket having a first number of teeth and a second number of ribs, wherein the ribs run between the planetary wheel axle and the sprocket, and, on the ribs, planetary wheel stop projections are arranged, which project beyond the sprocket along the planetary wheel axis of rotation. The first number of teeth may be equal to the second number of ribs, but this is not absolutely necessary. The use of ribs has the advantage, among other things, that they can be arranged where the loads on the planetary wheel are greatest. As a result, material can be saved without having to accept significant disadvantages in terms of the strength of the planetary wheel. The provision of planetary wheel stop projections has the advantage that wear surfaces are created without the wear occurring there having a significant negative impact on the functionality of the planetary wheel and consequently the planetary gear. The arrangement of the planetary wheel stop projections on the ribs makes it possible to arrange them at a comparatively small distance from the planetary wheel axis of rotation. As a result, the peripheral speed of the planetary wheel stop projections decreases, so that their stress is kept correspondingly low. The provision of the planetary wheel stop projections on the ribs is particularly useful for spur gearing, in which the acting axial forces are lower compared to helical gearing.

Another embodiment provides that the wheel body may comprise a sprocket having a first number of teeth and a second number of ribs, wherein the wheel body has at least one continuous planetary wheel stop projection which is arranged between the ribs and the sprocket. Again, the first number may be the same as the second number or the numbers may be different. Due to the fact that the planetary wheel stop projections are continuous and therefore uninterrupted, there is continuous contact with the respective mating surfaces. As a result, misalignments of the planetary wheel axes of rotation relative to the planetary carrier can be compensated for without a noticeably increased noise development occurring. The provision of a continuous planetary wheel stop projection is particularly useful in the case of helical gearing in which high axial forces occur.

According to a further embodiment, the ribs have a concave bulge with a radius in a plane running through the planetary wheel axis of rotation, a first end and a second end, wherein the bulge in the area of the first end merges into the first bearing section or into the second bearing section, and in the area of the second end merges into the planetary wheel stop projections.

The provision of a bulge ensures a uniform stress flow, so that stress peaks are avoided. The radius of bulge can be constant or change in this case. The change in the radius can be chosen in such a way that a particularly uniform stress flow results. For example, the radius can be smallest in an area in which a tangent to the bulge runs perpendicularly to the axis of rotation and can increase toward the radially inner end and toward the radially outer end. The favorable stress flow reduces the formation of stress peaks where the planetary wheel could fail in operation. Depending on the configuration of the bulge, this can also be approximated with a number of flat surfaces that are correspondingly inclined to one another. The inclination of the surfaces to one another is flatter in the outer area of the bulge and becomes steeper toward the center. However, the above explanations apply equally to such a configuration.

In a further embodiment, it may be appropriate that
the sprocket has a tooth base between two adjacently arranged teeth, and
at least one rib is arranged radially aligned with one of the tooth bases.

It has been shown that the probability of a tooth breaking is highest at the tooth base. The radially aligned arrangement of the ribs to the tooth bases consequently ensures that the tooth bases are supported. This significantly reduces the probability of the gear wheel failing at the tooth base.

According to a further embodiment, the first number can be greater than the second number. As mentioned, the first number refers to the teeth and the second number refers to the ribs. In this embodiment, a rib is not arranged in alignment on each tooth base. Rather, some tooth bases have no ribs. As a result, the distance between two adjacent ribs is increased circumferentially compared to two adjacent teeth. The pockets that form between two adjacent ribs are therefore larger compared to a configuration in which the first number and the second number are the same. This results in injection molding technical advantages in that tight radii and accumulations of material are avoided or at least kept small. These tight radii and accumulations of material can lead to overheating in the manufacture of the planetary wheel, which can cause blowholes to form. Although this blowhole formation can be corrected, this leads to a longer and more complicated manufacturing process. Since accumulations of material can be avoided in this embodiment, the planetary wheels can be manufactured faster and more cost-effectively.

In a further developed embodiment, the first number may be greater than the second number by an integer factor. This integer factor is, in particular, 2. However, it is also possible to choose, for example, 3 or 4 or greater as the integer factor. The pocket that is formed between two adjacent ribs can be chosen to be correspondingly large. The integer factor can be based in particular on the diameter of the planetary wheel, with a larger integer factor being able to be used for smaller diameters.

In a further developed embodiment, the ribs
form a first group of ribs having first ribs and a second group of ribs having second ribs, and
the first ribs of the first planetary wheel end face and the second ribs are arranged on the second planetary wheel end face, wherein
the first ribs are arranged rotated relative to the second ribs by an angle of rotation in a plane running perpendicular to the planetary wheel axis of rotation.

For example, in the event that the integer factor is 2, it is possible to choose the angle of rotation so that it corresponds to that angle which is enclosed by two adjacently arranged teeth and the planetary wheel axle. Thus, for example, each odd-numbered tooth base on the first planetary wheel end face and each even-numbered tooth base on the second planetary wheel end face are supported by a first rib and a second rib, respectively. As a result, each tooth base is supported on a planetary wheel end face, so that the tooth bases are evenly supported. This reduces the likelihood of the teeth breaking at the tooth base.

One design of the invention relates to a planetary carrier for a planetary wheel according to any one of the previous embodiments, comprising a carrier body which
    extends along a planetary carrier axis of rotation,
    comprises a first disk-shaped body and
    a second disk-shaped body, wherein
    the first disk-shaped body and the second disk-shaped body are connected to one another with at least one connecting body,
    the first disk-shaped body has at least one first bearing recess,
        into which the first bearing section of the planetary wheel can be introduced, and
        which has at least one circumferentially extending first catching projection, and
    the second disk-shaped body has at least one second bearing recess,
        into which the second bearing section of the planetary wheel can be introduced, and
        which has at least one circumferentially extending second catching projection.

As mentioned at the outset, the planetary gears can be provided with a planetary wheel bore, as a result of which the planetary wheels are provided with increased elasticity, particularly in the first bearing section and in the second bearing section. As mentioned before also, the planetary wheels are introduced with their first bearing sections and with their second bearing sections during assembly of the planetary gear into the first bearing recesses or the second bearing recesses of the planetary carrier. For this purpose, the first and second catching projections are briefly elastically compressed and then return to their original state. However, not only the first and the second catching projections are elastically deformed, but also the first and the second bearing sections. The deformations are consequently distributed to the first and second catching projections as well as to the first and second bearing sections. This reduces the probability of irreversible plastic deformation, in particular of the catching projections, or plastic deformation is prevented.

Because of these processes that take place during assembly, a catching, snapping or clip connection is provided, which is characterized by particularly simple and quick assembly.

The first and the second catching projections wrap around the first bearing section or the second bearing section, viewed radially outward, as a result of which an undercut acting radially outward is provided. The planetary wheel inserted into the bearing recesses is thereby pre-fixed and cannot become detached from the planetary carrier, even if the planetary carrier is not yet inserted into a hollow wheel together with the planetary wheels. In addition, said pre-fixing causes a more stable operation of the planetary gear. The first bearing recess and the second bearing recess comprise sections approximately in the shape of a sector of a circular ring, with which the planetary wheels are guided and centered when they are introduced. As a result, the areas of the sections in the shape of a sector of a circular ring enclose a recess angle. To minimize the friction and consequently wear that occurs as a result of this contact, the planetary gears are usually lubricated with oil or grease. In operation, the catching projections cause a suction effect which leads to the oil being sucked into the bearing recesses. By the choice of the recess angle, the suction effect can be increased or decreased.

As a result, the run-in characteristic of the planetary wheels in the sun wheel and the hollow wheel is improved, which means that the wear on the planetary gear can be reduced. In addition, the noise level is kept low.

In a further design, it can be provided that
    at least one first axial counter-stop surface surrounding the first bearing recess is provided on the first disk-shaped body and/or
    at least one second axial counter-stop surface surrounding the second bearing recess is provided on the second disk-shaped body, wherein
    the first axial counter-stop surface and/or the second axial counter-stop surface interact(s) with the planetary wheel stop projections when the planetary wheel is introduced into the first bearing recess and the second bearing recess, wherein
    the first axial counter-stop surface is adjoined toward the first bearing recess by a first inclined surface which is inclined at a first inclined surface angle relative to the first axial counter-stop surface and/or
    the second axial counter-stop surface is adjoined toward the second bearing recess by a second inclined surface, which is inclined at a second inclined surface angle relative to the second counter-stop surface.

As mentioned, the planetary wheels have planetary gear stop projections. In operation, the planetary wheel stop projections contact the first axial counter-stop surfaces and the second axial counter-stop surfaces, respectively, of the planetary carrier, whereby axial forces acting on the planetary wheels are transmitted to and absorbed by the planetary carrier. As already mentioned, in order to minimize the friction and consequently the wear which occurs as a result of this contact, the planetary gears are usually lubricated with oil or grease. The first inclined surface and/or the second inclined surface cause a suction effect which, in connection with the rotational movement of the planetary wheel relative to the planetary carrier, sucks the oil or grease between the planetary wheel stop projections and the first axial counter-stop surface or the second axial counter-stop surface. This ensures that there is a sufficient quantity of oil or grease to keep the friction described above and the associated wear low.

Depending on the inclination of the first inclined surface and/or the second inclined surface, the suction effect is stronger or weaker.

According to a further developed design, the first axial counter-stop surface with a convex first inclined surface bulge merges into the first inclined surface and the second axial counter-stop surface with a convex second inclined surface bulge merges into the second inclined surface. Together with the respective inclined surfaces, the inclined surface bulges increase the suction effect described above.

According to a further developed design, the carrier body may have
    at least one radially outer connecting body,
    at least one radially inner connecting body and at least one further connecting body arranged between the radially outer connecting body and the radially inner connecting body, wherein the radially outer connecting body, the radially inner connecting body and the further connecting body connect the first disk-shaped body to the second disk-shaped body.

All connecting bodies establish a connection between the first disk-shaped body and the second disk-shaped body. Referring to the planetary carrier shown in WO 2014/0095966 A1, it is noticeable that there the first disk-shaped body and the second disk-shaped body are only connected to one another with a total of four connecting bodies arranged on the outer circumference of the disk-shaped bodies. In contrast, the radially inner connecting body, the radially outer connecting body and the further connecting body are distributed significantly more evenly over the entire planetary carrier. This achieves a correspondingly uniform flow of force between the first disk-shaped body and the second disk-shaped body, which leads to increased stability of the carrier body overall. Since increased stability also leads to less deformation in operation of the planetary gear, increased stability also causes less wear.

In a further design, it can be provided that the further connecting body is connected to the radially outer connecting body and the radially inner connecting body. In this design, a closed force profile between the radially outer connecting body and the radially inner connecting body is brought about by the further connecting body being connected both to the radially outer connecting body and to the radially inner connecting body. This also increases the stability of the carrier body with the technical effects mentioned above.

A further developed design can specify that the radially outer connecting body and the at least one further connecting body enclose a closed recess of the second disk-shaped body. Because a closed recess is formed by the radially outer connecting body and at least one further connecting body, material for the second disk-shaped body can be saved without the strength being adversely affected to any significant extent.

According to a further design, at least one of the further connecting bodies merges with a concave first bulge into the first axial counter-stop surface. For example, in the case of the planetary carrier shown in WO 2014/0095966 A1, the first axial counter-stop surface and the further connecting body abut one another directly and at least theoretically form an edge. At least no bulge is provided, with which the first axial counter-stop surface merges into the further connecting body. In contrast, the concave first bulge has the effect that stress peaks in the transition from the first counter-stop surface to the further connecting body are avoided or at least reduced. The transition from at least one further connecting body to the second axial counter-stop surface can also be configured accordingly, with a concave second bulge being able to be provided here.

According to a further developed design, the concave first bulge has a radius as well as a first end and a second end, wherein the first bulge in the area of the first end merges into the first axial counter-stop surface and in the area of the second end into the further connecting body, wherein the radius decreases from the first end and the second end. This creates a particularly favorable stress profile between the further connecting body and the first disk-shaped body. The favorable stress profile avoids the formation of stress peaks where the carrier body could fail in operation. Depending on the configuration of the bulge, said bulge can also be approximated with a number of flat surfaces that are correspondingly inclined to one another. The inclination of the surfaces to one another is flatter in the outer area of the bulge and becomes steeper toward the center. However, the above explanations apply equally to such a configuration.

In addition, at least one of the further connecting bodies can merge into the second axial counter-stop surface with a concave second bulge, with the radius of the second bulge changing correspondingly to the radius of the first bulge.

According to a further developed design, the first disk-shaped body can form a first free planetary carrier end face on which a number of reinforcement ribs are arranged. In this design, the torque is introduced into the planetary carrier via the first disk-shaped body or dissipated from the planetary carrier. As a result, the first disk-shaped body is subjected to significantly higher loads than the second disk-shaped body. This load is absorbed by the reinforcement ribs.

In a further design it may be provided that the reinforcement ribs start out
from the first catching projections, or
radially inward toward the catching projections from the first bearing recesses,
or from a planetary wheel axis of rotation circle, and
run radially inward.

A planetary wheel axis of rotation circle is understood to mean a circle which runs through the axes of rotation of the planetary wheels when these are inserted in the planetary carrier. The reinforcement ribs then start out from where this circle leaves the first bearing recesses and merges into the first disk-shaped body.

The reinforcement ribs can be straight or can have a bulge. The introduction of force from the planetary wheels into the first disk-shaped body of the planetary carrier takes place approximately at the starting point of the ribs. The load on the first disk-shaped body is correspondingly high there. Due to the fact that the reinforcement ribs start out from the area of the highest load, this area is supported by the reinforcement ribs, so that the first disk-shaped body is given increased strength as a result. The reinforcement ribs run along the flow of force within the first disk-shaped body.

The first disk-shaped body can have a driving toothing radially on the inside. Said toothing can interact with an insert, with which a torque can be introduced into the planetary carrier or dissipated from it. The insert has a further contour outside of the planetary carrier, with which the insert can be connected to a shaft. However, it is also possible for the driving toothing to interact with a shaft. The reinforcement ribs can end radially on the inside tangentially to said driving toothing and in particular tangentially to the tip circle diameter of this driving toothing. As a result, the acting force is introduced into the carrier toothing and/or into the insert in a particularly effective manner and with avoidance of stress peaks.

A further developed design may specify that the first bearing recess has a first extension along the planetary carrier axis of rotation and the second bearing recess has a second extension along the planetary carrier axis of rotation, wherein the first extension is larger than the second extension.

As mentioned, the insert serves to introduce a torque into the carrier body and in particular into the first disk-shaped body or to dissipate a torque from the carrier body and in particular from the first disk-shaped body. In order to be able to reliably transmit the torque between the insert and the carrier body, it is therefore necessary to provide the first disk-shaped body with a sufficient wall thickness. This is achieved in that the first extension is larger than the second extension. It is not necessary to also provide the second disk-shaped body with an increased wall thickness. As a result, the dimensions of the carrier body and, as a result, the consumption of material are not increased unnecessarily.

According to a further developed design, a number of planetary carrier stop projections can be provided on the first disk-shaped body, which are arranged adjacent to the first bearing recesses. The present planetary gear is mainly intended for the use of spur gearing, with helical gearing up to a certain helix angle also being considered. In the event that spur gearing is used, the acting axial forces are theoretically 0 or very low, but in practice, for example due to gearing errors within the tolerances, the acting axial forces are so high that they have to be taken into account. The planetary carrier stop projections form wear surfaces when the planetary carrier contacts adjacent components. The wear that occurs on the planetary carrier stop projections does not affect the functionality of the planetary gear, or affects it only to a negligible extent. As mentioned, the highest forces or highest torques are transmitted in the area of the bearing recesses and in particular in the area of the catching projections between the carrier body and the planetary wheels. For this reason, as also mentioned above, the reinforcement ribs start out from the bearing recesses and in particular from the area of the catching projections. This fact is used to absorb the forces that are introduced into the carrier body of the planetary carrier via the planetary carrier stop projections. Compared to an arrangement of the planetary carrier stop projections approximately in the middle between two adjacently arranged bearing recesses, the acting bending moments relative to the bearing recesses are kept low, whereby the load on the carrier body is kept low overall.

According to a further developed design, an insert can be connected to the first disk-shaped body and the insert can comprise a fastening body, with which the insert is connected to the carrier body, wherein the fastening body has a radially outward-pointing connecting surface which forms at least one radial expansion and a connecting toothing.

In order to be able to reliably transmit the torques already mentioned several times between the carrier body and the insert, the connecting body of the insert is provided with connecting toothing. The connecting toothing can be used to provide a large contact area between the insert and the carrier body, as a result of which the surface pressure is kept correspondingly low. With the radial expansion, said contact area can be further increased and the surface pressure can be further reduced. In addition, the radial expansion causes a certain eccentricity in some sections, which has a positive effect on torque transmission. The radial expansion can provide the insert with a hypotrochoid shape. The connecting toothing can have as many small teeth as possible with a large tooth tip radius. This also avoids stress peaks or keeps them low.

Exemplary embodiments of the invention are explained in more detail below with reference to the accompanying drawings. In the figures.

Figure 1:
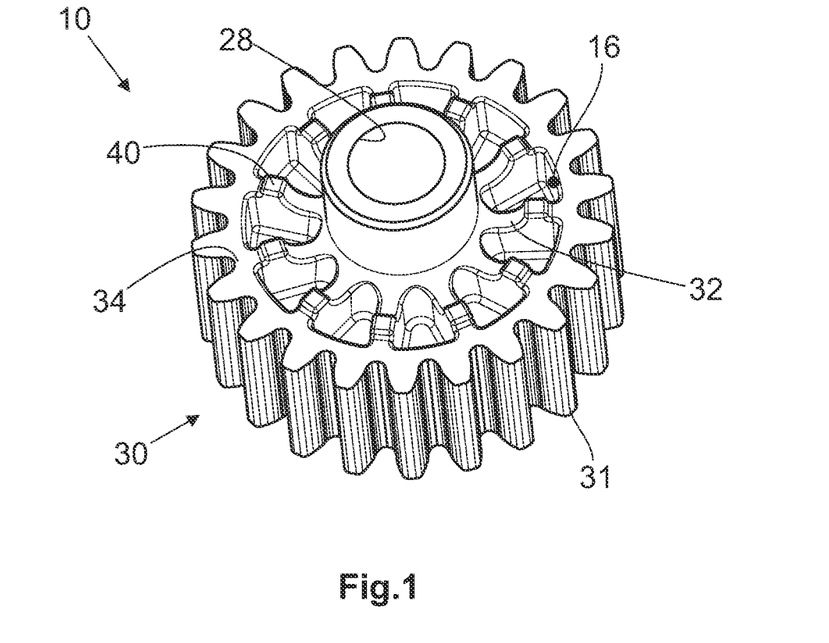
FIG. 1 shows a perspective representation of a planetary wheel according to the invention.
Figure 2:
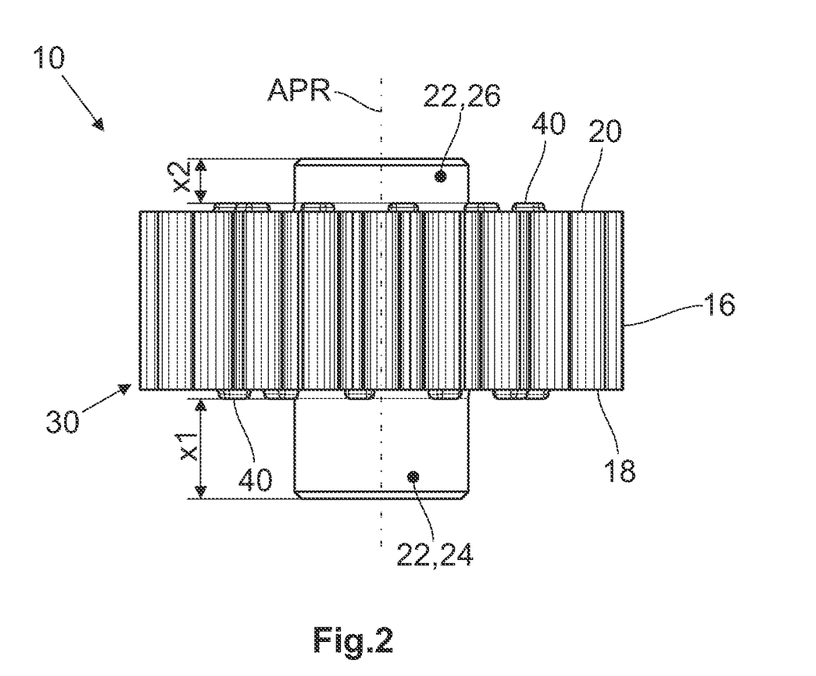
FIG. 2 shows a plan view of the planetary wheel shown in FIG. 1.
Figure 3:
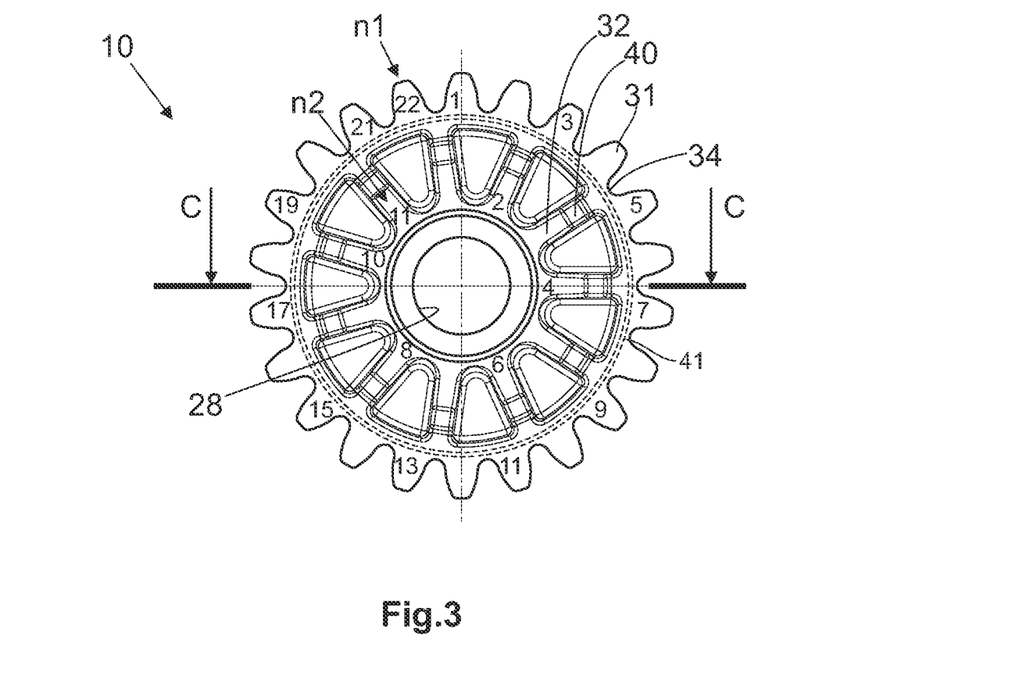
FIG. 3 shows a front view of the planetary wheel shown in FIG. 1.
Figure 4:
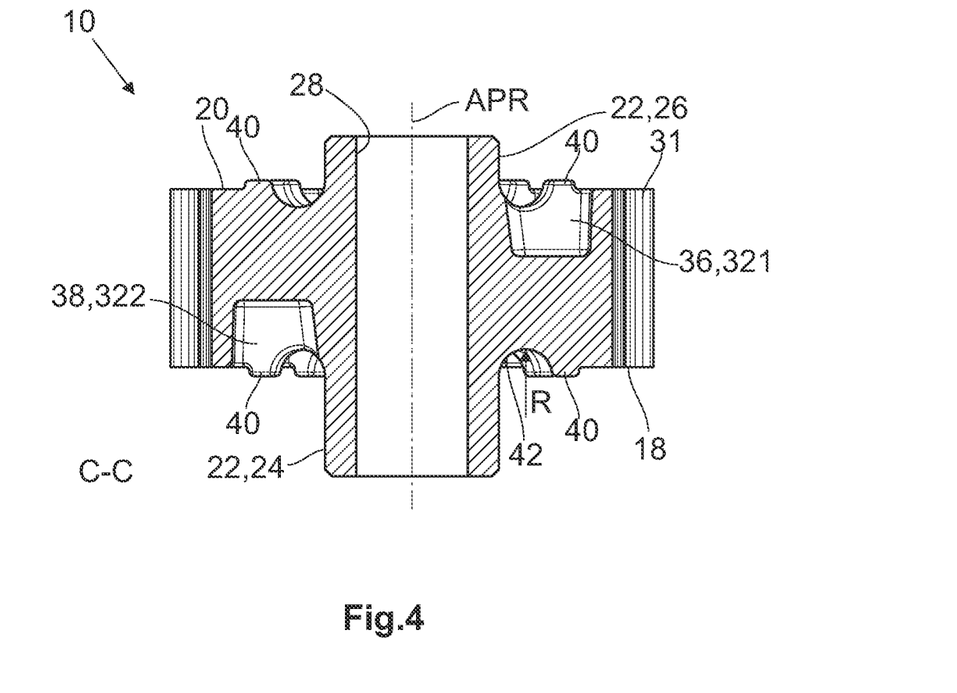
FIG. 4 shows a sectional representation along the sectional plane C-C defined in FIG. 3.

FIG. 1 shows a perspective representation of a planetary wheel 10 according to the invention, FIG. 2 shows a plan view of the planetary wheel 10 shown in FIG. 1, FIG. 3 shows a front view and FIG. 4 shows a sectional representation of the planetary gear 10. Unless otherwise stated, the following explanations relate to FIGS. 1 to 4. Said planetary wheel 10 can be inserted into a planetary carrier 44, which is shown, inter alia, in FIG. 5, and can, together with a ring gear 13 illustrated merely schematically, form a planetary gear 14

Planetary wheel 10 has a wheel body 16 which forms a first planetary wheel end face 18 and a second planetary wheel end face 20. In addition, planetary gear 10 comprises a planetary gear axle 22, which is formed by wheel body 16 in the exemplary embodiment shown. In this respect, planetary wheel axis 22 is an integral part of planetary wheel 10. Planetary wheel axle 22 defines a planetary wheel axis of rotation APR (FIG. 4) about which planetary wheel 10 rotates when planetary gear 14 is in operation. Furthermore, planetary wheel axle 22 forms a first bearing section 24 and a second bearing section 26, which can be seen in particular in FIG. 2. With first bearing section 24 and second bearing section 26, planetary wheel 10 can be rotatably mounted in planetary carrier 44, which will be discussed in more detail below.

As can be seen from FIG. 2, first bearing section 24 has a first extension x1 along planetary wheel axis of rotation APR and second bearing section 26 has a second extent x2, also along planetary gear axis of rotation APR, wherein first extension x1 is larger than second extension x2.

As can be seen in particular from FIG. 4, planetary wheel 10 is provided with a planetary wheel bore 28 which runs coaxially to the planetary wheel axis of rotation APR and which runs through planetary wheel 10 completely. The exact function of planetary wheel bore 28 will be discussed in more detail below. At this point it should be pointed out that it is not absolutely necessary for the function of planetary wheel bore 28 that it runs coaxially to the planetary wheel axis of rotation APR. In addition, it does not necessarily have to have a circular cross section. The ratio of first extension x1 to second extension x2 also has no significant influence on the functionality of planetary wheel bore 28.

Planetary wheel 10 forms a sprocket 30 with a first number n1 of teeth 31, wherein the first number n1 of teeth 31 is twenty-two (22) in the exemplary embodiment shown, as can be seen in particular from FIG. 3. In addition, planetary wheel 10 is provided with a second number n2 of ribs 32 which run in the radial direction between sprocket 30 and planetary wheel axle 22. It can be seen from FIG. 3 that the second number n2 of ribs 32 is eleven (11) and is therefore smaller than the first number n1. Sprocket 30 forms a tooth base 34 between two adjacently arranged teeth 31, wherein a rib 32 is arranged radially aligned with one of these tooth bases 34, which can be deduced in particular from FIGS. 1 and 3.

As mentioned, the second number n2 of ribs 32 is half the first number n1 of teeth 31. As a result, not every tooth base 34 but only every second tooth base 34 is provided radially inward with a radially aligned rib 32. Ribs 32, which are arranged on first planetary gear end face 18, can be assigned to a first group of ribs 36, wherein ribs 32 of the first group of ribs 36 are referred to as first ribs 321. Similarly, a second group of ribs 38 can be defined, the ribs 32 of which are referred to as second ribs 322. It can be seen from FIG. 4 that first ribs 321 are arranged rotated relative to second ribs 322 by an angle of rotation in a plane running perpendicularly to planetary wheel axle 22. This angle of rotation corresponds to the angle which two adjacent teeth 31 enclose in the previously defined plane. This ensures that each tooth base 34 is supported either on the first planetary wheel end face 18 or the second planetary wheel end face 20 with a first rib 321 or a second rib 322.

A planetary wheel stop projection 40 is arranged on each of ribs 32 and projects beyond sprocket 30 along the planetary wheel axis of rotation APR (see in particular FIG. 2). It can be seen from FIG. 4 that a concave bulge 42 adjoins planetary wheel stop projections 40 radially inward. In FIG. 4, bulge 42 has a constant radius R, with this radius R also being able to change in order to provide a stress profile that is as uniform as possible and to avoid or at least reduce stress peaks. Consequently, radius R can be chosen in such a way that the stresses in the area of bulge 42 under the expected loads in operation are smaller than in sprocket 30.

In FIG. 3, additionally, a continuous planetary wheel stop projection 41 is shown with dashed lines, which can be provided as an alternative or in addition to planetary wheel stop projections 40. Continuous planetary wheel stop projection 41 is arranged radially outside of the planetary wheel stop projections 40 between ribs 32 and sprocket 30.

Figure 5:
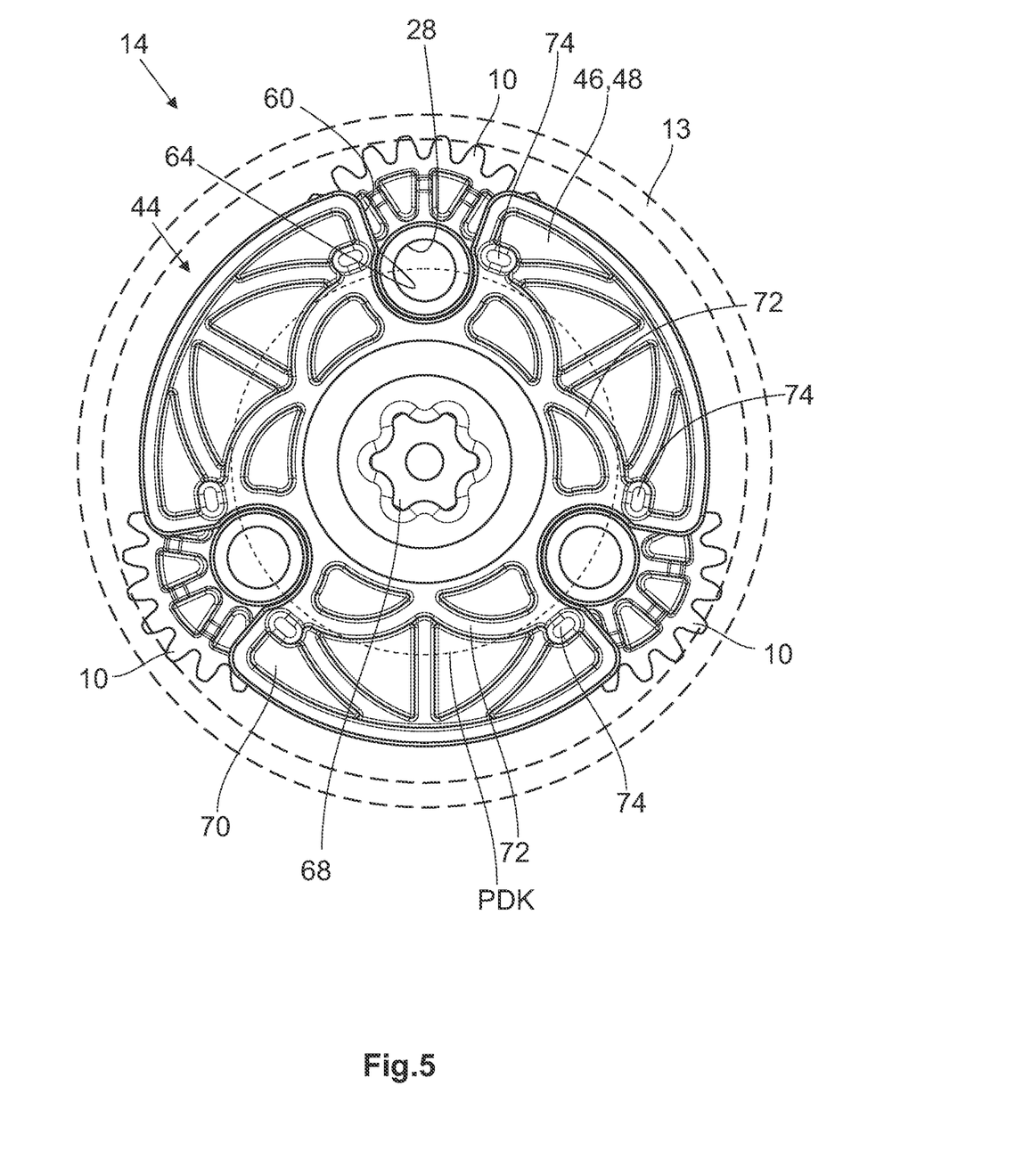
FIG. 5 shows a front view of a planetary carrier according to the invention with three planetary wheels shown in FIGS. 1 to 4.
Figure 6:
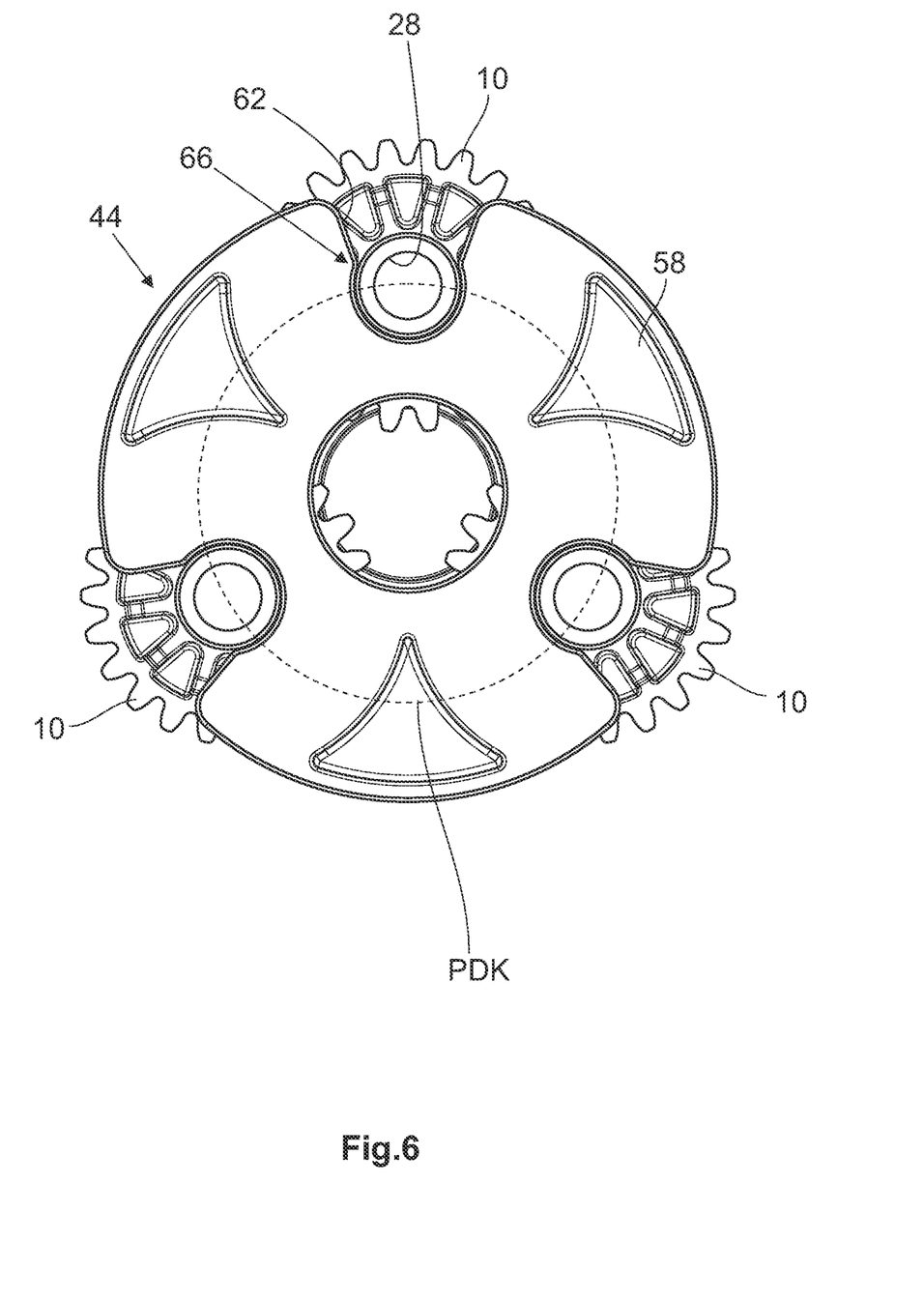
FIG. 6 shows a rear view of the planetary carrier according to the invention in FIG. 5.
Figure 7:
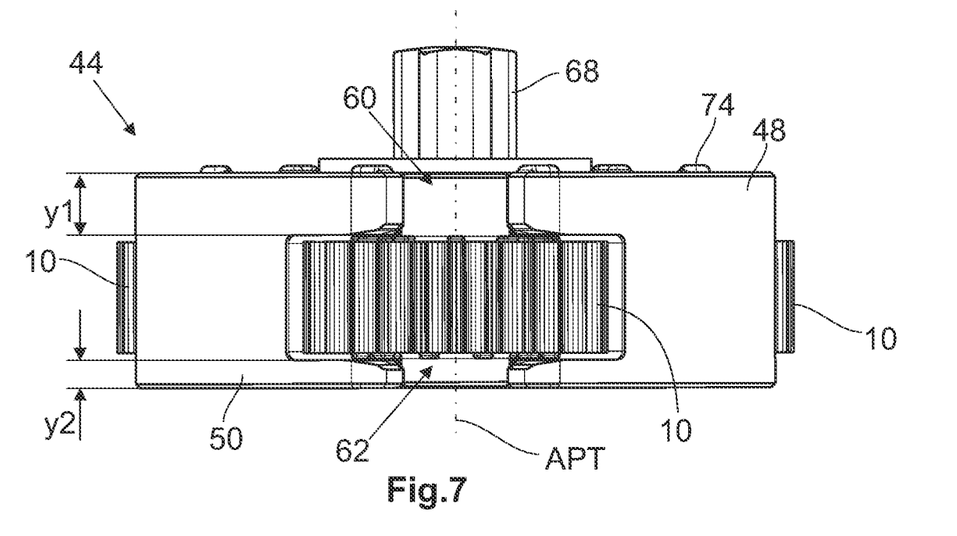
FIG. 7 shows a plan view of the planetary carrier shown in FIG. 5.
Figure 8:
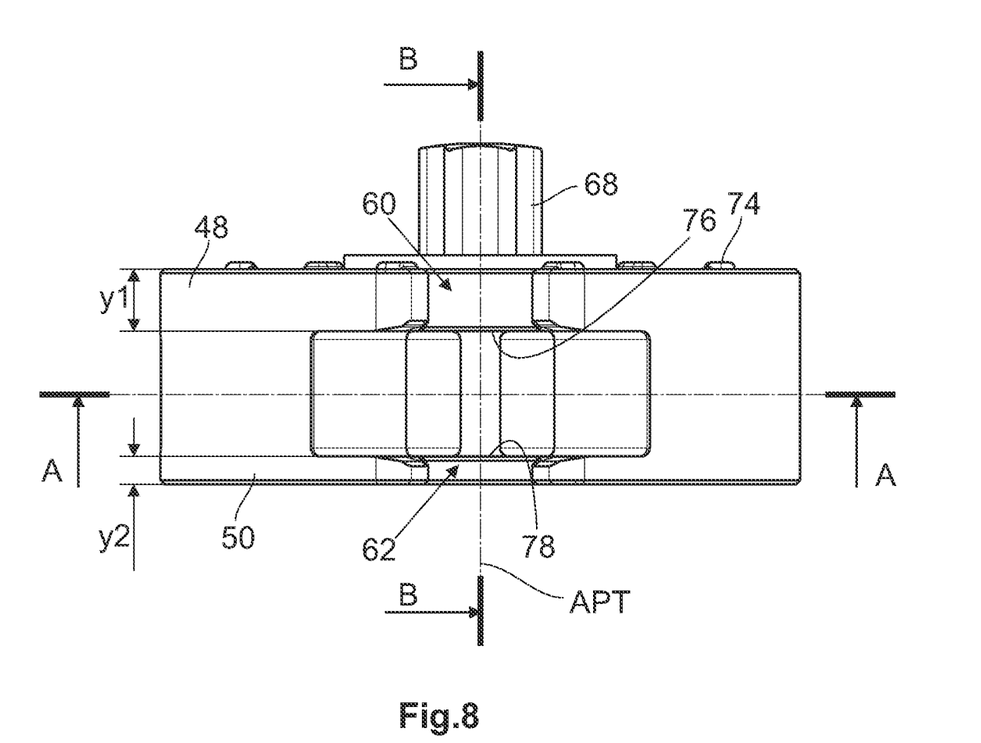
FIG. 8 shows a plan view of the planetary carrier shown in FIG. 5 without the planetary wheels.
Figure 9:
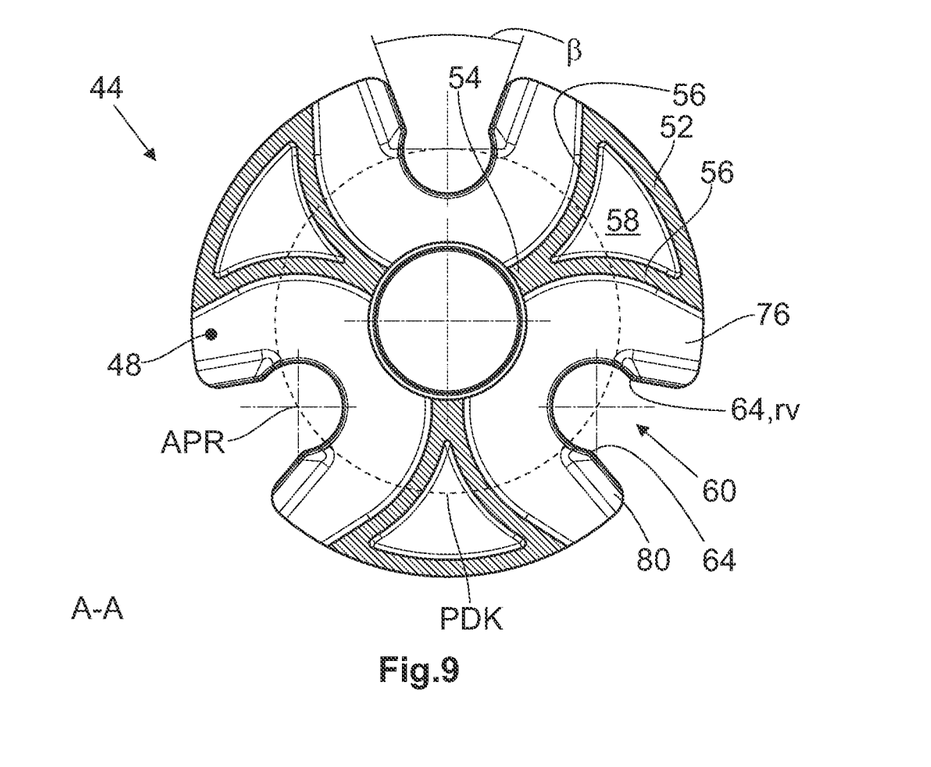
FIG. 9 shows a sectional view along the sectional plane A-A defined in FIG. 8.
Figure 10:
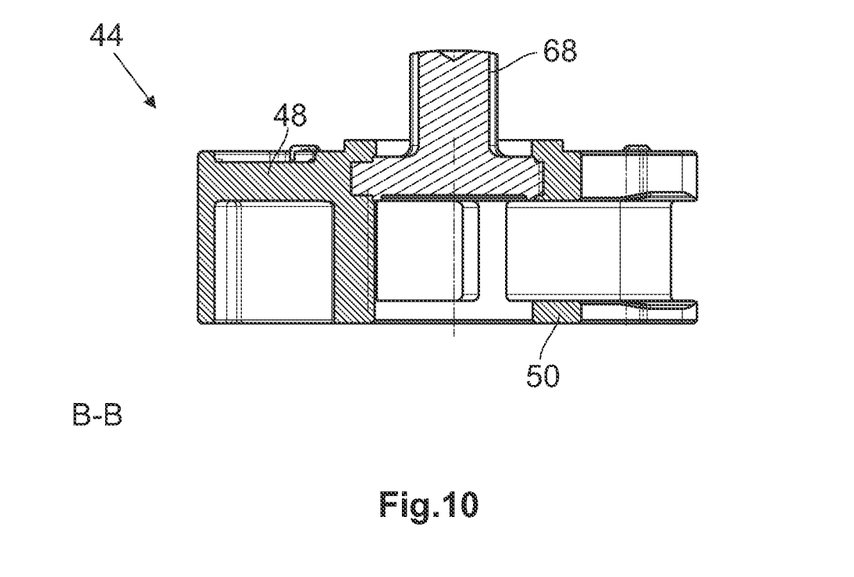
FIG. 10 shows a sectional view along the sectional plane B-B defined in FIG. 8.

In FIGS. 5 to 14, a planetary carrier 44 according to the present invention is shown in different views. Unless otherwise stated, the following description relates to FIGS. 5 to 14. Planetary carrier 44 comprises a carrier body 46 which extends along a planetary carrier axis of rotation APT, which is best seen in FIGS. 7 and 8. The carrier body 46 comprises a first disk-shaped body 48 and a second disk-shaped body 50, first disk-shaped body 48 being viewed in FIG. 5 and second disk-shaped body 50 being viewed in FIG. 6. First disk-shaped body 48 and second disk-shaped body 50 are connected to one another by a number of radially outer connecting bodies 52, a number of radially inner connecting bodies 54 and a number of further connecting bodies 56 arranged in between. Referring to FIG. 9, it can be seen that a total of three radially outer connecting bodies 52 are provided, which are constructed in the shape of a ring. Correspondingly, there are three radially inner connecting bodies 54, the circumferentially outer ends of the radially outer connecting bodies 52 being the starting point in each case of a further connecting body 56, which combine in the radially inner connecting body. While the radially outer connecting body 52 is bulged out convexly, the two further connecting bodies 56 are concavely bulged out. Due to this configuration, radially outer connecting body 52 and the two further connecting bodies 56 enclose a recess 58 of second disk-shaped body 50, which can be viewed in particular in FIG. 6.

Figure 16:
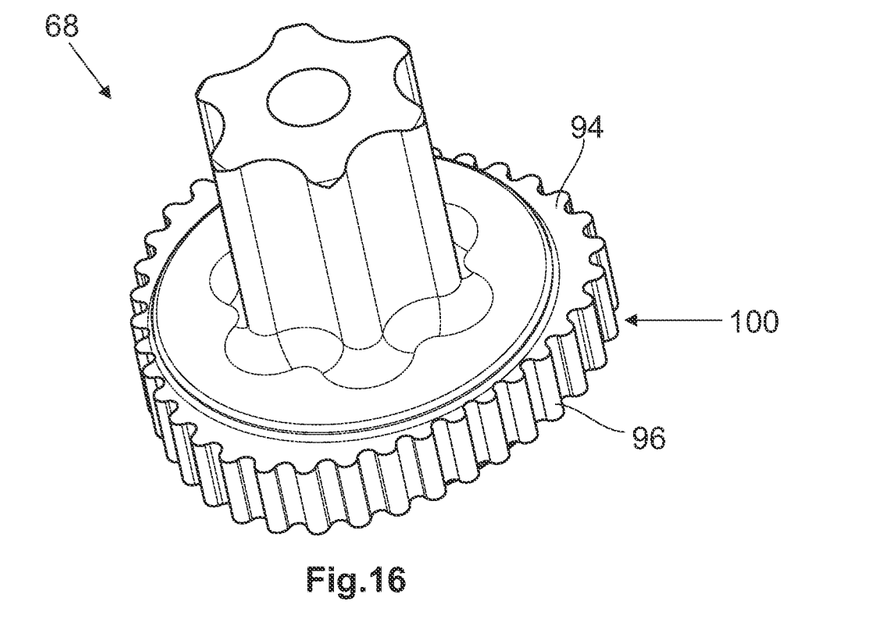
FIG. 16 shows a perspective representation of an insert.
Figure 17:
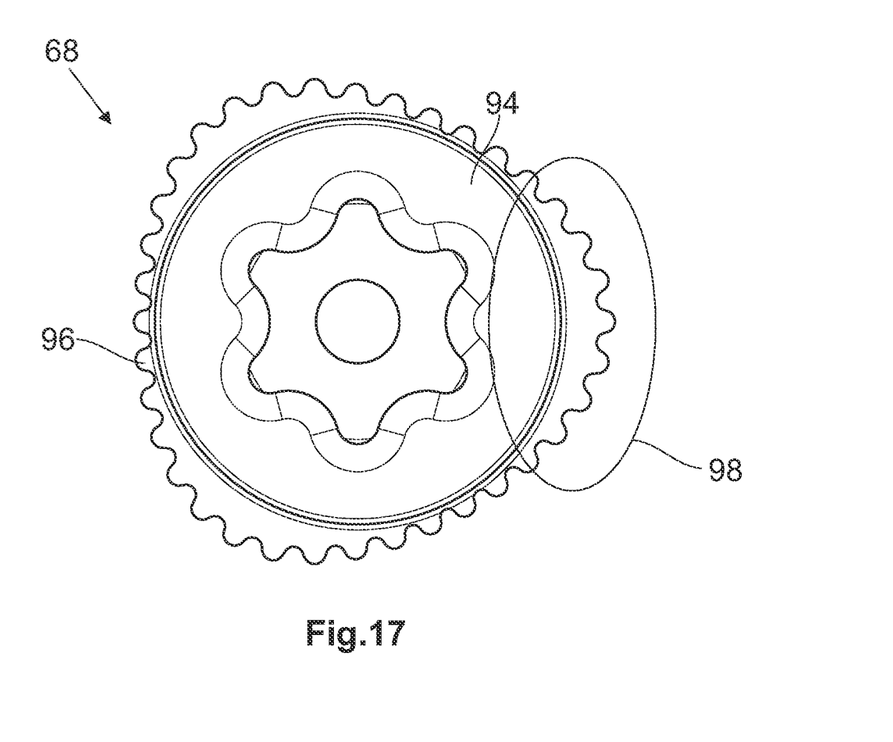
FIG. 17 shows a front view of the insert shown in FIG. 16

In FIGS. 5 to 7, planetary carrier 44 is shown in a state in which three planetary wheels 10, as shown in FIGS. 1 to 4, are rotatably connected to planetary carrier 44. For this purpose, first disk-shaped body 48 has a total of three first bearing recesses 60 and second disk-shaped body 50 has a total of 3 second bearing recesses 62. First bearing recesses 60 are provided with first catching projections 64 and second bearing recesses 62 are provided with second catching projections 66. As can be seen in particular from FIGS. 7 and 8, first bearing recess 60 has a first extension y1 and second bearing recess 62 has a second extension y2 along planetary carrier axis of rotation APT, wherein first extension y1 is larger than second extent y2. It can also be seen from FIGS. 7 and 8 that an insert 68, which is shown separately in FIGS. 16 and 17, is connected to first disk-shaped body 48, wherein insert 68 is overmolded, for example. First extension y1 is chosen in such a way that insert 68 can be integrated into first disk-shaped body 48 as completely as possible. Insert 68 serves to introduce a torque into planetary carrier 44 or to dissipate a torque from planetary carrier 44.

The assembly of planetary gear 14 is carried out as follows: A pin of an assembly tool (not shown) is introduced into planetary wheel bore 28 and then planetary wheel 10 is introduced into one of first bearing recesses 60 and one of second bearing recesses 62 with a radially inward movement. During introduction, both first bearing section 24 and second bearing section 26 of planetary wheel 10 and first catching projections 64 and second catching projections 66 deform elastically. As soon as first bearing section 24 has been completely introduced into first bearing recess 60 and second bearing section 26 has been completely introduced into second bearing recess 62, the elastic deformation is reversed. First catching projections 64 and second catching projections 66 form an undercut that acts radially outward relative to first bearing section 24 and second bearing section 26 of planetary wheel 10 and circumferentially project into the bearing recesses. As a result, the planetary gears 10 are pre-fixed to a certain extent, so that they cannot be detached from planetary carrier 44 even if it has not yet been introduced into ring gear 13. In addition, the contact surface between bearing sections 24, 26 and bearing recesses 60, 62 is enlarged, so that the wear is distributed more evenly.

The undercut formed by catching projections 64, 66 also causes the lubricant to be sucked into bearing recesses 60, 62 in operation of planetary gear 14. Referring in particular to FIG. 9, it can be seen, that bearing recesses 60, 62 have a circular section and a section in the shape of a sector of a circular ring which merge into one another in catching projections 64, 66. The sections in the shape of a sector of a circular ring enclose a recess angle β. By varying said recess angle β, the suction effect can be increased or reduced.

As mentioned, the sections in the shape of a sector of a circular ring merge into the circular sections in the area of catching projections 64, 66. It is provided in this case that the section in the shape of a sector of a circular ring merges into the circular section with a transition radius rv. The suction effect can also be influenced by means of the transition radius rv.

FIG. 5 shows a first free planetary carrier end face 70, on which a number of reinforcement ribs 72 are arranged. In FIGS. 5, 6 and 9, a planetary wheel axis of rotation circle PDK is drawn with dashed lines. The planetary wheel axis of rotation circle PDK runs through the planetary wheel axis of rotation APR when planetary wheels 10 are inserted into planetary carrier 44 (see in particular FIG. 9). If reinforcement ribs 72 are extended conceptually, they start from the planetary wheel axes of rotation APR when they are inserted into planetary carrier 44. In the illustrated exemplary embodiment, reinforcement ribs 72 run somewhat radially inward on both sides of first catching projections 64 from first bearing recesses 60 and radially inward toward insert 68 in such a way that, at the radially inner end, they run approximately tangentially relative to the tip of the tooth of the toothing of insert 68.

In addition, a total of six planetary carrier stop projections 74 are arranged adjacent to first catching projections 64 on first free planetary carrier end face 70.

Figure 11:
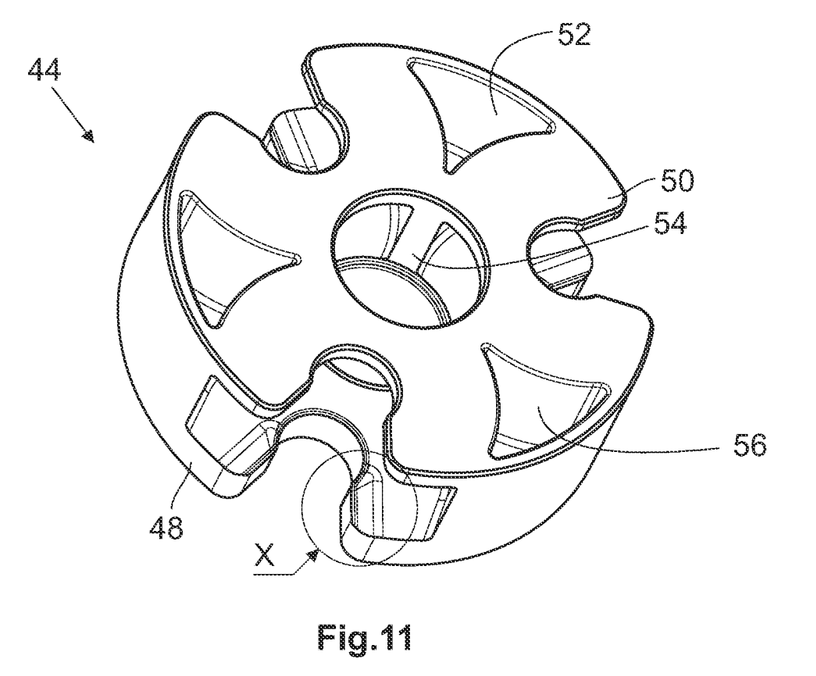
FIG. 11 shows a perspective representation of the planetary carrier shown in FIG. 5, looking at a second disk-shaped body.
Figure 12:
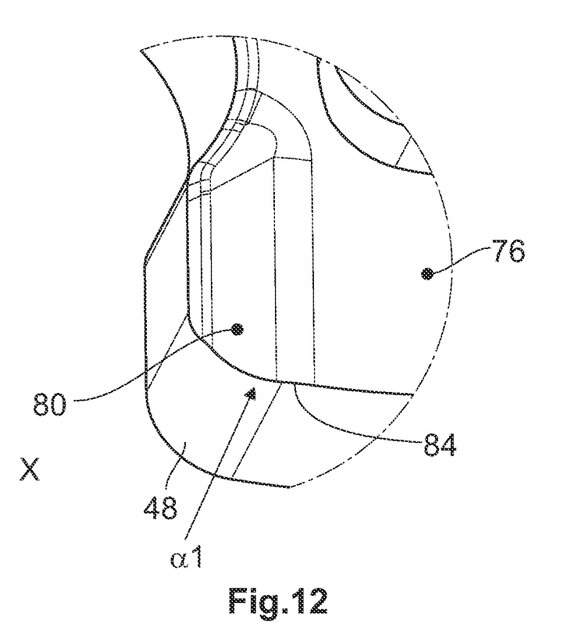
FIG. 12 shows an enlarged representation of section X defined in FIG. 11.
Figure 13:
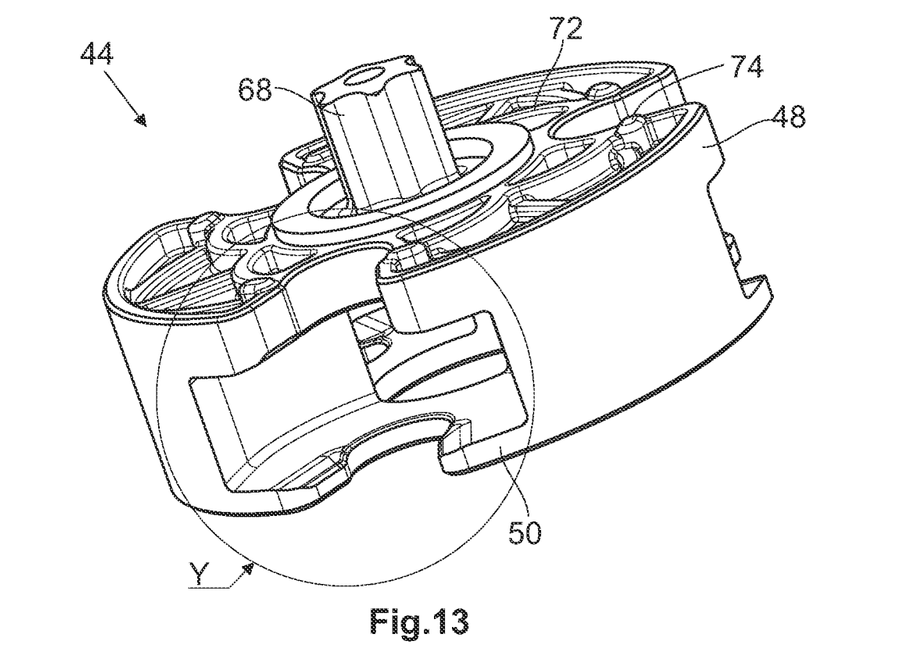
FIG. 13 shows a perspective representation of the planetary carrier shown in FIG. 5, looking at a first disk-shaped body.
Figure 14:
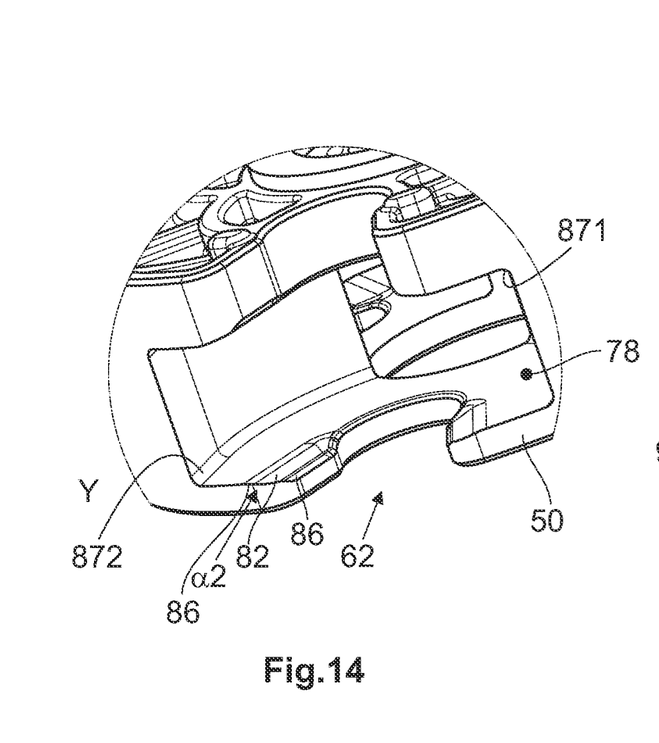
FIG. 14 shows an enlarged representation of section Y defined in FIG. 13.

As can be seen in particular from FIGS. 11, 13 and 14, first disk-shaped body 48 forms a first axial counter-stop surface 76 which encloses first bearing recess 60. Accordingly, second disk-shaped body 50 forms a second axial counter-stop surface 78 which encloses second bearing recess 62. In operation, planetary wheel stop projections 40 cooperate with first counter stop surface 76 or second counter-stop surface 78. In this case, a first inclined surface 80 adjoins first counter-stop surface 76 toward first bearing recess 60, which first inclined surface 80 is inclined at a first inclined surface angle $\alpha 1$ relative to first counter-stop surface 76. In this case, first inclined surface 80 merges with a convex first inclined surface bulge 84 into first axial counter-stop surface 76. Accordingly, a second inclined surface 82 adjoins toward second bearing recess 62, wherein the second inclined surface 82 is inclined at a second inclined surface angle $\alpha 2$ relative to the second counter-stop surface 78. Second inclined surface 82 merges with a second inclined surface bulge 86 into the second axial counter-stop surface 78.

First inclined surface 80 and second inclined surface 82 together with the rotation of the planetary wheel 10 cause a suction effect with which oil or grease which is used to lubricate planetary gear 14 is sucked between the planetary wheel stop projections 40 and the first axial counter-stop surface 76 and the second axial counter-stop surface 78. Depending on the inclination of first inclined surface 80 and second inclined surface 82, the suction effect is greater or smaller. In addition, certain misalignments of the planetary gear axes of rotation APR relative to the planetary carrier axis of rotation APR or deformations due to the torque introduced can be compensated for without increased noise emission or increased wear occurring.

Figure 15:
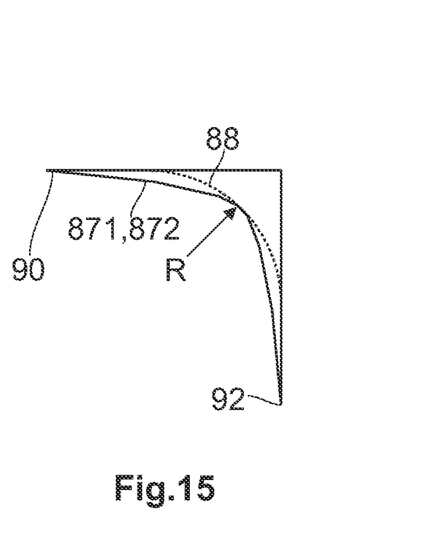
FIG. 15 shows a basic enlarged representation of the radius marked in FIG. 14.

FIG. 11 shows the first axial counter-stop surface 76 and a transition from first axial counter-stop surface 76 to a further connecting body 56 becomes apparent, with a first bulge 871 being formed. FIG. 14 shows second axial counter-stop surface 78 and one of further connecting bodies 56. It can be seen that further connecting body 56 merges into second axial counter-stop surface 78 with a second bulge 872. First bulge 871 and second bulge 872 are shown schematically in FIG. 15. First bulge 871 and second bulge 872 have a changing radius R in this case. In comparison, FIG. 15 also shows a comparative bulge 88 as a dashed line, which has a constant radius R. First bulge 871 and second bulge 872 have a first end 90 and a second end 92. Radius R of first bulge 871 and second bulge 872 decreases from the first end 90 and the second end 92 toward the center, so that where in FIG. 15 first bulge 871 or second bulge 872 and comparative bulge 88 touch, the bulge has the smallest radius R. Due to this configuration of first bulge 871 and second bulge 872, a particularly uniform stress profile is provided.

In FIGS. 16 and 17, already mentioned insert 68 is shown separately. In this case, insert 68 comprises a fastening body 94 with which insert 68 can be connected to carrier body 46. Fastening body 94 has a connecting surface 96 pointing radially outward and forming a connecting toothing 100. Furthermore, connecting surface 96 forms three radial expansions 98, so that connecting toothing 100 has a certain eccentricity in sections. The three radial expansions 98 provide attachment body 94 with a hypotrochoid shape. The number of eccentric expansions 98 corresponds to the number of planetary wheels 10 of planetary gear 14, wherein the maximum radius of an eccentric expansion 98 is arranged between two adjacently arranged planetary wheels 10. The number and characteristics of eccentric expansions 98 can be chosen in such a way that any acting stresses are kept low. The characteristics of eccentric expansions 98 are understood to mean, inter alia, their size and geometric shape. As mentioned, radial expansions 98 are based on a hypotrochoid. With the appropriate choice of the relevant parameters, radial expansions 98 can be configured in such a way that the shape of fastening body 94 approaches that of a polygon, here a triangle, or a circle. As mentioned, insert 68 is surrounded by first disk-shaped body 48 in the area of fastening body 94. The profile of reinforcement ribs 72 is chosen in such a way that as large a part of the forces as possible is introduced approximately tangentially into insert 68 and in particular into the tooth tips arranged in radial expansions 98. As a result, torque can be transmitted between insert 68 and planetary carrier 44.

LIST OF REFERENCE NUMERALS 10 planetary wheel
13 ring gear
14 planetary gear
16 wheel body
18 first planetary wheel end face
20 second planetary wheel end face
22 planetary wheel axle
24 first bearing section
26 second bearing section
28 planetary wheel hole
30 sprocket
31 teeth
32 ribs
321 first ribs
322 second ribs
34 tooth base
36 first group of ribs
38 second group of ribs
40 planetary wheel stop projection
42 bulge
44 planetary carrier
46 carrier body
48 first disk-shaped body
50 second disk-shaped body
52 radially outer connecting body
54 radially inner connecting body
56 further connecting body 58 recess
60 first bearing recess
62 second bearing recess
64 first catching projection
66 second catching projection
68 insert
70 first free planetary carrier end face
72 reinforcement rib
74 planetary carrier stop projection
76 first axial counter-stop surface
78 second axial counter-stop surface
80 first inclined surface
82 second inclined surface
84 first inclined surface bulge
86 second inclined surface bulge
871 first bulge
872 second bulge
88 comparative bulge
90 first end
92 second end
94 fastening body
96 connecting surface
98 radial expansion
100 connecting toothing
APR planetary wheel axis of rotation
APT planetary carrier axis of rotation
n1 first number
n2 second number
R radius
x1 first extension
x2 second extension
y1 first extension
y2 second extension
α1 first inclined surface angle
α2 second inclined surface angle
β recess angle

The invention claimed is:

1. A planetary wheel (10) for a planetary gear, comprising a wheel body (16) with a first planetary wheel end face (18) and a second planetary wheel end face (20), a planetary wheel axle (22), which
    defines a planetary wheel axis of rotation (APR) of the planetary wheel (10), and comprises
    a first bearing section (24) and
    a second bearing section (26), wherein
    the first bearing section (24) projects beyond the first planetary wheel end face (18) and the second bearing section (26) projects beyond the second planetary wheel end face (20),
wherein at least one planetary wheel bore (28) running coaxially or parallel to the planetary wheel axis of rotation (APR) at least partially runs through the planetary wheel axle (22),
wherein the wheel body (16) comprises
    a sprocket (30) having a first number (n1) of teeth (31) and
    a second number (n2) of ribs (32), wherein
    the ribs (32) run between the planetary wheel axle (22) and the sprocket (30), and
wherein
on the ribs (32), planetary wheel stop projections (40) are arranged, which project beyond the sprocket (30) along the planetary wheel axis of rotation (APR),
or
the wheel body (16) has at least one continuous planetary wheel stop projection (41) which is arranged between the ribs (32) and the sprocket (30).

2. The planetary wheel (10) according to claim 1, characterized in that the planetary wheel (10) has exactly one planetary wheel bore (28) which runs through the entire planetary wheel (10).

3. The planetary wheel (10) according to claim 1, characterized in that
    the first bearing section (24) has a first extension (x1) starting out from the first planetary wheel end face (18) and
    the second bearing section (26) has a second extension (x2) starting out from the second planetary wheel end face (20), wherein
    the first extension (x1) is different from the second extension (x2).

4. The planetary wheel (10) according to claim 1, characterized in that the planetary wheel axle (22) is formed by the wheel body (16).

5. The planetary wheel (10) according to claim 1, characterized in that
    the ribs (32) have a concave bulge (42) with
        a radius (R) in a plane running through the planetary wheel axis of rotation (APR),
        a first end (90) and a second end (92), and
    the bulge (42)
        in the area of the first end (90) merges into the first bearing section (24) or into the second bearing section (26), and
    in the area of the second end (92) merges into the planetary wheel stop projections (40).

6. The planetary wheel (10) according to claim 1, characterized in that
    the sprocket (30) has a tooth base (34) between two adjacently arranged teeth (31), and
    at least one rib (32) is arranged radially aligned with one of the tooth bases (34).

7. The planetary wheel (10) according to claim 1, characterized in that the first number (n1) is greater than the second number (n2).

8. The planetary wheel (10) according to claim 7, characterized in that the first number (n1) is greater than the second number (n2) by an integer factor.

9. The planetary wheel (10) according to claim 1, characterized in that the ribs (32)
    form a first group of ribs (36) having first ribs (321) and a second group of ribs (38) having second ribs (322), wherein
    the first ribs (321) of the first planetary wheel end face (18) and the second ribs (322) are arranged on the second planetary wheel end face (20), wherein
    the first ribs (321) are arranged rotated relative to the second ribs (322) by an angle of rotation in a plane running perpendicular to the planetary wheel axis of rotation (APR).

10. Planetary carrier (44) for a planetary wheel (10) according to claim 1, comprising a carrier body (46) which
    extends along a planetary carrier axis of rotation (APT),
    comprises a first disk-shaped body (48) and
    a second disk-shaped body (50), wherein
    the first disk-shaped body (48) and the second disk-shaped body (50) are connected to one another with at least one connecting body (52, 54, 56),
    the first disk-shaped body (48) has at least one first bearing recess (60),
        into which the first bearing section (24) of the planetary wheel (10) can be introduced, and
        which has at least one circumferentially extending first catching projection (64), and the second disk-shaped body (50) has at least one second bearing recess (62),
  into which the second bearing section (26) of the planetary wheel (10) can be introduced, and
  which has at least one circumferentially extending second catching projection (66),
wherein
at least one first axial counter-stop surface (76) surrounding the first bearing recess (60) is provided on the first disk-shaped body (48) and/or
at least one second axial counter-stop surface (78) surrounding the second bearing recess (62) is provided on the second disk-shaped body (50),
wherein
the first axial counter-stop surface (76) and/or the second axial counter-stop surface (78) interact(s) with the planetary wheel stop projections (40) when the planetary wheel (10) is introduced into the first bearing recess (60) and the second bearing recess (62), wherein
the first counter-stop surface (76) is adjoined toward the first bearing recess (60) by a first inclined surface (80) which is inclined at a first inclined surface angle ($\alpha 1$) relative to the first counter-stop surface (76) and/or
the second counter-stop surface (78) is adjoined toward the second bearing recess (62) by a second inclined surface (82), which is inclined at a second inclined surface angle ($\alpha 2$) relative to the second counter-stop surface (76).

11. The planetary carrier (44) according to claim 10, characterized in that
the first axial counter-stop surface (76) merges into the first inclined surface (80) with a convex first inclined surface bulge and/or
the second axial counter-stop surface (78) merges into the second inclined surface (82) with a convex second inclined surface bulge.

12. The planetary carrier (44) according to claim 10, characterized in that the carrier body (46) has
at least one radially outer connecting body (52),
at least one radially inner connecting body (54) and
at least one further connecting body (56) arranged between the radially outer connecting body (52) and the radially inner connecting body (54), wherein
the radially outer connecting body (52), the radially inner connecting body (54) and the further connecting body (56) connect the first disk-shaped body (48) to the second disk-shaped body (50).

13. The planetary carrier (44) according to claim 12, characterized in that the further connecting body (56) is connected to the radially outer connecting body (52) and the radially inner connecting body (54).

14. The planetary carrier (44) according to claim 12, characterized in that the radially outer connecting body (52) and the at least one further connecting body (56) surround a closed recess (58) of the second disk-shaped body (50).

15. The planetary carrier (44) according to claim 12, characterized in that
at least one of the further connecting bodies (56) having a concave first bulge (871) merges into the first axial counter-stop surface (76).

16. The planetary carrier (44) according to claim 15, characterized in that
wherein the concave first bulge (871) has
a radius (R) as well as
a first end (90) and a second end (92), and
the first bulge (871) in the area of the first end (90) merges into the first axial counter-stop surface (76) and in the area of the second end (92) into the further connecting body (56), wherein
the radius (R) decreases starting out from the first end (90) and the second end (92).

17. The planetary carrier (44) according to claim 10, characterized in that the first disk-shaped body (48) forms a first free planetary carrier end face (70) on which a number of reinforcement ribs (72) are arranged.

18. The planetary carrier (44) according to claim 10, characterized in that
the first bearing recess (60) has a first extension (y1) along the planetary carrier axis of rotation (APT) and
the second bearing recess (62) has a second extension (y2) along the planetary carrier axis of rotation (APT), wherein
the first extension (y1) is larger than the second extension (y2).

19. The planetary carrier (44) according to claim 10, characterized in that a number of planetary carrier stop projections (74) are provided on the first disk-shaped body (48) and are arranged adjacent to the first bearing recesses (60).

20. The planetary carrier (44) according to claim 10, characterized in that
an insert (68) is connected to the first disk-shaped body and the insert (68)
comprises a fastening body (94) by means of which the insert (68) is connected to the carrier body (46), wherein
the fastening body (94) has a radially outward-pointing connecting surface (96), which forms
at least one radial expansion (98) and
a connecting toothing (100).

* * * * *